United States Patent
Min et al.

(10) Patent No.: US 9,298,208 B2
(45) Date of Patent: Mar. 29, 2016

(54) APPARATUS FOR REDUCING CLUTCH PEDAL EFFORT

(71) Applicants: Hyundai Motor Company, Seoul (KR); Kia Motors Corp., Seoul (KR); Dong Hee Industrial Co., Ltd., Ulsan (KR)

(72) Inventors: Jeong Seon Min, Gwangju (KR); Young Seok Song, Busan (KR)

(73) Assignees: Hyundai Motor Company, Seoul (KR); Kia Motors Corp., Seoul (KR); Dong Hee Industrial Co., Ltd., Ulsan (KR)

(*) Notice: Subject to any disclaimer, the term of this patent is extended or adjusted under 35 U.S.C. 154(b) by 0 days.

(21) Appl. No.: 14/333,222

(22) Filed: Jul. 16, 2014

(65) Prior Publication Data
US 2015/0177774 A1    Jun. 25, 2015

(30) Foreign Application Priority Data
Dec. 20, 2013    (KR) ........................ 10-2013-0160610

(51) Int. Cl.
*B60K 23/02*    (2006.01)
*G05G 1/40*    (2008.04)
*G05G 5/05*    (2006.01)

(52) U.S. Cl.
CPC ........ *G05G 1/40* (2013.01); *B60K 23/02* (2013.01); *G05G 5/05* (2013.01); *Y10T 74/20888* (2015.01)

(58) Field of Classification Search
CPC ............ G05G 1/30; G05G 1/40; G05G 1/44; G05G 1/46; G05G 5/03; G05G 7/04; B60K 26/021; B60K 23/02; F15D 23/12; Y10T 74/20528; Y10T 74/2057
See application file for complete search history.

(56) References Cited

U.S. PATENT DOCUMENTS 3,199,367 A * 8/1965 Zetye .............................. 74/512

FOREIGN PATENT DOCUMENTS

| | | | | |
|---|---|---|---|---|
| GB | 447084 A | * | 6/1935 | .............. G05G 7/04 |
| JP | 1-145230 A | | 6/1989 | |
| JP | 3-262731 A | | 11/1991 | |
| JP | 5-324110 A | | 12/1993 | |
| JP | 2010-90949 A | | 4/2010 | |
| JP | 2010-144886 A | | 7/2010 | |
| KR | 100820241 B1 | | 4/2008 | |
| KR | 1020120057142 A | * | 5/2012 | ............. B60K 26/02 |
| KR | 1020120057141 A | | 6/2012 | |

* cited by examiner

*Primary Examiner* — Thomas Diaz
(74) *Attorney, Agent, or Firm* — Morgan, Lewis & Bockius LLP

(57) ABSTRACT

An apparatus for reducing a clutch pedal effort may include a switching lever that is rotatably assembled to a pedal member and selectively engaged with a pedal arm and a reaction providing unit, a first end of which is engaged with the pedal member and a second end of which is engaged with the switching lever.

8 Claims, 7 Drawing Sheets

APPARATUS FOR REDUCING CLUTCH PEDAL EFFORT

CROSS REFERENCE TO RELATED APPLICATION

The present application claims priority to Korean Patent Application No. 10-2013-0160610, filed on Dec. 20, 2013, the entire contents of which is incorporated herein for all purposes by this reference.

BACKGROUND OF THE INVENTION

1. Field of the Invention

The present invention relates, in general, to an apparatus for reducing clutch pedal effort and, more particularly, to a technology relating to an apparatus for reducing clutch pedal effort, which can reduce pedal effort that may be sensed by a driver when working a clutch pedal, and which can be efficiently used in a vehicle that is equipped with a high horsepower engine capable of generating high output power, without breaking parts of the vehicle.

2. Description of Related Art

In a manual transmission car, to realize efficient transmission of engine power to a gearbox when a clutch disc and a flywheel are coupled together such that power transmission can be realized, it is required to avoid slip between the clutch disc and the flywheel.

In recent years, as the performance of cars has gradually improved, high horsepower engines capable of generating high output power are generally used in such vehicles. When a high horsepower engine is used in a car, it is required to increase the spring force of a diaphragm compared to that of a typical diaphragm in an effort to realize reliable coupling of the clutch disc to the flywheel. As a technology for increasing the spring force of the diaphragm, the diameter of a turnover spring may be increased.

However, when increasing the spring force of the turnover spring, the pedal effort of the clutch pedal is also increased and this causes a problem in that a driver easily feels fatigued while working the clutch pedal. Particularly, when increasing the diameter of the turnover spring in an effort to increase the spring force, the load concentrated on the turnover spring is also increased, so parts, such as a spring bushing, etc., used to connect the turnover spring to a pedal member may be easily broken.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for reducing clutch pedal effort, which can reduce pedal effort that may be sensed by a driver when working a clutch pedal, and which can be efficiently used in a vehicle that is equipped with a high horsepower engine capable of generating high output power, without breaking parts of the vehicle.

In an aspect of the present invention, an apparatus for reducing a clutch pedal effort may include a switching lever that is rotatably assembled to a pedal member and selectively engaged with a pedal arm, and a reaction providing unit, a first end of which is engaged with the pedal member and a second end of which is engaged with the switching lever.

The apparatus for reducing the clutch pedal effort may include the switching lever that is rotatably assembled to the pedal member with a hinge pipe, through which a pedal hinge passes, such that, when the pedal arm is rotated, the switching lever is rotated along with the pedal arm in a state in which the switching lever comes into contact with the pedal arm, and the reaction providing unit that is placed at a location above the pedal hinge, with the first end thereof combined with the pedal member and the second end thereof combined with the switching lever, wherein when the switching lever is not rotated, the reaction providing unit sets an initial position of the switching lever by restricting a movement of the switching lever using accumulated elasticity thereof, wherein when the switching lever is rotated forward together with the pedal arm, the reaction providing unit intensifies a forward rotation of the pedal arm, and wherein when the switching lever is rotated rearward together with the pedal arm, the reaction providing unit provides a reaction force to the pedal arm via the switching lever.

To allow the reaction providing unit to set the initial position of the switching lever in a state in which the pedal arm is not worked, a joint at which the switching lever is combined with the reaction providing unit is placed ahead of a reference line that passes both a center of the pedal hinge and a joint at which the pedal member is combined with the reaction providing unit.

The switching lever may include a lever body that is a straight flat plate, a cylindrical flange formed on a first end of the lever body so as to be coupled to the hinge pipe, locking protrusions formed on opposite surfaces of the first end of the lever body by protruding such that a lower end of the reaction providing unit is combined with the locking protrusions, a front rod that is bent from a first side surface of a second end of the lever body such that the front rod faces a front surface of the pedal arm, and a rear rod that is bent from a second side surface of the second end of the lever body such that the rear rod faces a rear surface of the pedal arm.

The front rod and the rear rod are combined with a front stopper and a rear stopper, respectively, so as to control contact timing of the front and rear rods with the pedal arm.

The front stopper and the rear stopper are coupled with the front rod and the rear rod, respectively, by a thread so as to adjust protruding lengths of the front and rear stoppers relative to the pedal arm.

The reaction providing unit may include a rotating shaft rotatably installed by passing through opposite side surfaces of the pedal member, a shaft holder having a surface contact groove formed on a first end of the shaft holder so as to be supported by coming into surface contact with an outer circumferential surface of the rotating shaft, and a guide pin axially extending from a second end of the shaft holder, a lever holder having a fork part formed in a first end of the lever holder and having a locking groove so as to be engaged with the locking protrusions of the switching lever, and a holder rod axially extending from a second end of the lever holder and having a pin insert hole so as to receive the guide pin of the shaft holder therein, a nut engaged with the holder rod, and a compression spring fitted over the holder rod in a state in which opposite ends of the compression spring are stopped by the shaft holder and the nut, respectively.

The holder rod is provided with external threads around an outer circumferential surface thereof in an axial direction of the holder rod, and the nut is engaged with the external threads of the holder rod such that the nut adjusts elasticity of the compression spring by moving along the axial direction of the holder rod.

The locking groove is open forward based on a state in which the pedal arm is not rotated, and an opening angle of the locking groove is designed such that, to prevent the locking protrusions from being removed from the locking groove during a rotation of the switching lever, the opening angle of the locking groove is inclined downward at a predetermined angle of inclination relative to an axis along which the locking protrusions are combined with the locking groove.

As described above, the present invention is advantageous in that, during a rotation of the pedal arm worked by a driver, the clutch pedal effort that may be sensed by the driver can be greatly reduced, so the present invention can efficiently attenuate fatigue of the driver while working the pedal arm. Further, during an initial state in which the pedal arm is not worked, the present invention can induce complete restoring of the pedal arm to an original position thereof, thereby realizing reliable coupling of a clutch disc to a flywheel and being efficiently used in a vehicle that is equipped with a high horsepower engine capable of generating high output power, without breaking parts of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
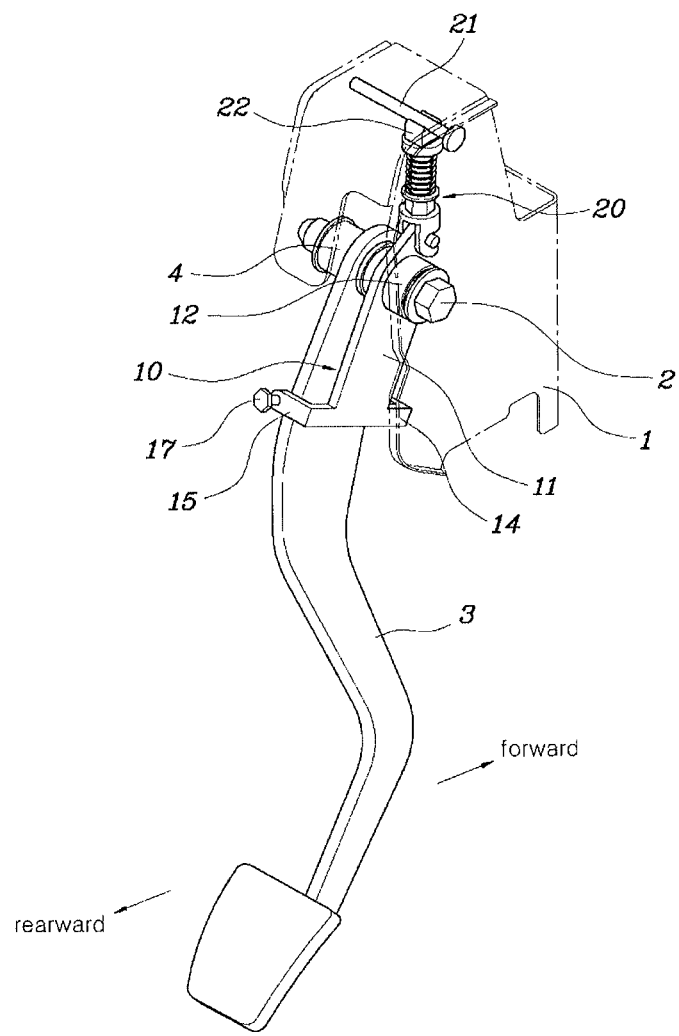
FIG. 1 is a perspective view of a clutch pedal provided with a pedal effort reducing apparatus according to an exemplary embodiment of the present invention.
Figure 2:
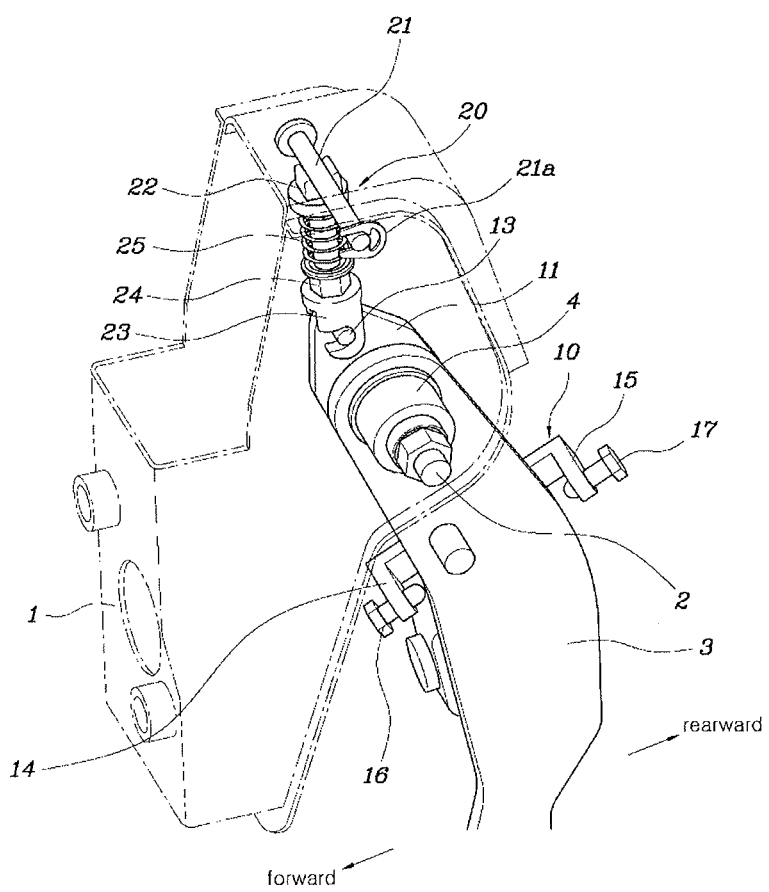
FIG. 2 is an enlarged view of FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, an apparatus for reducing clutch pedal effort according to a preferred embodiment of the present invention will be described in detail with reference to the accompanying drawings.

As shown in FIGS. 1 to 7, the apparatus for reducing the clutch pedal effort according to an exemplary embodiment of the present invention includes: a pedal member 1 that is mounted to a dash panel provided in front of a lower part of a driver's seat, a pedal arm 3 that is rotatably mounted to the pedal member 1 with the intervention of a pedal hinge 2 between the pedal arm 3 and the pedal member 1 such that the pedal arm 3 can be rotated forward and rearward, a switching lever 10 that is rotatably assembled with a hinge pipe 4, through which the pedal hinge 2 passes, such that, when the pedal arm 3 is rotated, the switching lever 10 can be rotated along with the pedal arm 3 in a state in which the switching lever 10 comes into contact with the pedal arm 3, and a reaction providing unit 20 that is placed at a location above the pedal hinge 2, with a first end thereof combined with the pedal member 1 and a second end thereof combined with the switching lever 10, the reaction providing unit 20 operated in such a way that, when the switching lever 10 is not rotated, the reaction providing unit 20 can set an initial position of the switching lever 10 by restricting the movement of the switching lever 10 using accumulated elasticity thereof, and when the switching lever 10 is rotated forward together with the pedal arm 3, the reaction providing unit 20 can intensify the forward rotation of the pedal arm 3, and when the switching lever 10 is rotated rearward together with the pedal arm 3, the reaction providing unit 20 can provide a reaction force to the pedal arm 3 via the switching lever 10.

Here, the hinge pipe 4 is combined with the pedal arm 3 by passing through the upper part of the pedal arm 3, and is installed in the pedal member 1. After placing both the pedal arm 3 and the hinge pipe 4 relative to the pedal member 1, the pedal hinge 2 is installed by passing through opposite side surfaces of both the hinge pipe 4 and the pedal member 1. Here, the upper part of the pedal arm 3 is rotatably mounted to the pedal member 1 with the intervention of the pedal hinge 2 between the pedal arm 3 and the pedal member 1 such that the pedal arm 3 can be rotated forward and rearward.

Figure 3:
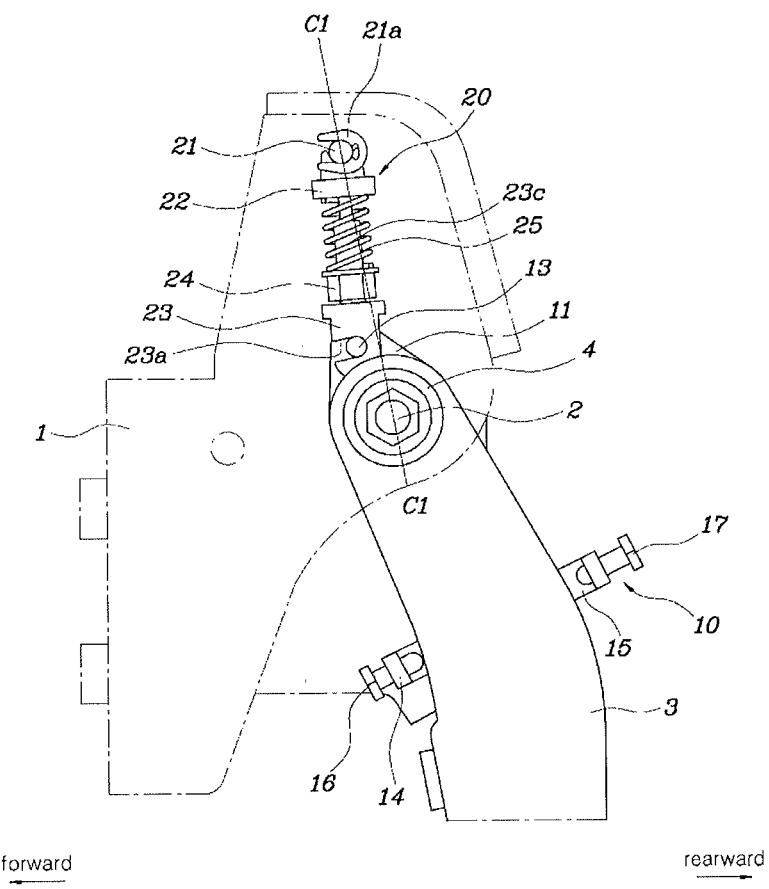
FIG. 3 is a side view of FIG. 1, which shows an initial state of the apparatus before a diver works a pedal arm.
Figure 4:
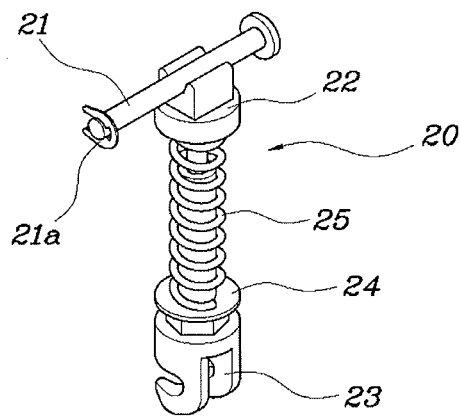
FIG. 4 is a perspective view showing both a switching lever and a reaction providing unit according to an exemplary embodiment of the present invention.
Figure 4:
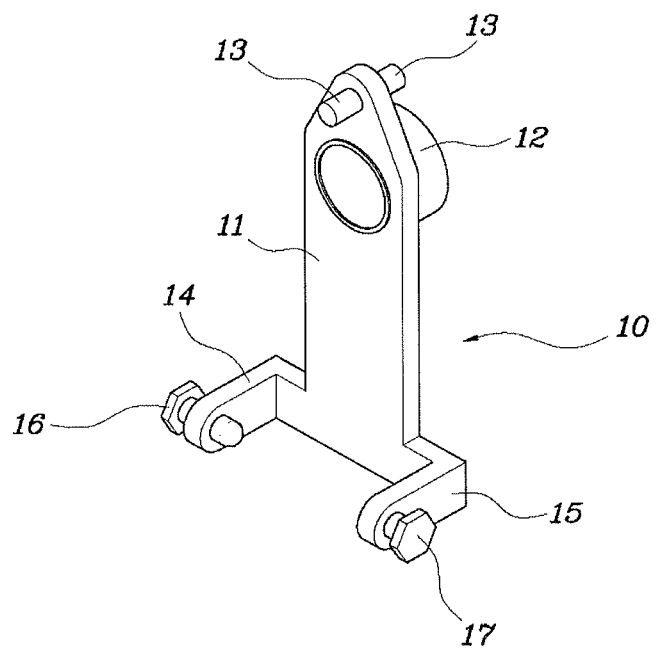
Figure 5:
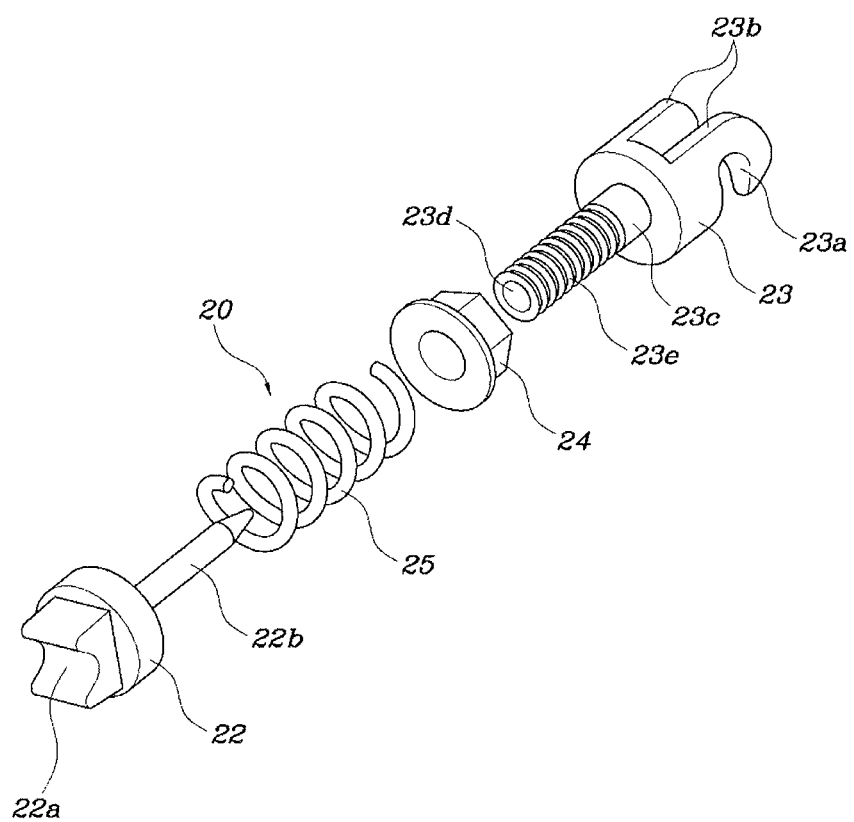
FIG. 5 is an exploded perspective view showing the reaction providing unit according to an exemplary embodiment of the present invention.
Figure 6:
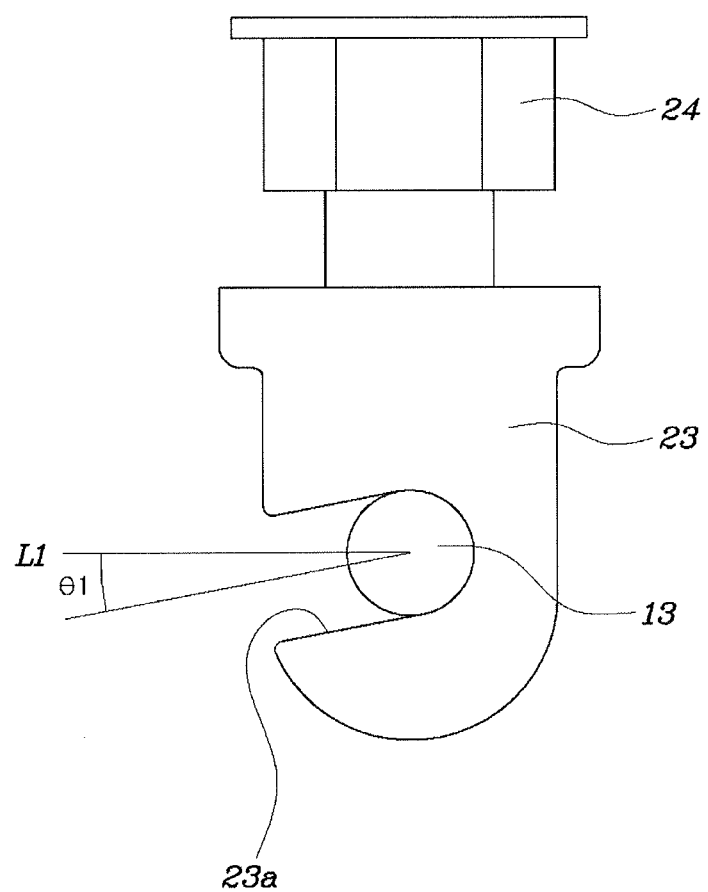
FIG. 6 is a view showing a locking groove of a lever holder according to an exemplary embodiment of the present invention.

As shown in FIG. 3, the apparatus of the present invention is configured such that, based on a reference state in which the pedal arm 3 is not worked, that is, the switching lever 10 is not rotated, the joint at which the switching lever 10 is combined with the lower end of the reaction providing unit 20 is placed ahead of a reference line C1 that is a line passing both the center of the pedal hinge 2 and the joint at which the pedal member 1 is combined with the upper end of the reaction providing unit 20. Due to the above-mentioned configuration, the reaction providing unit 20 can set an initial position of the switching lever 10 by restricting the movement of the switching lever 10 using accumulated elasticity thereof.

Further, the switching lever 10 according to an exemplary embodiment of the present invention includes: a lever body 11 that is a straight flat plate, a cylindrical flange 12 that is formed on the first end of the lever body 11 so as to be inserted into the hinge pipe 4, locking protrusions 13 formed on opposite surfaces of the first end of the lever body 11 by protruding such that the lower end of the reaction providing unit 20 can be combined with the locking protrusions 13, a front rod 14 that is bent from a first side surface of the second end of the lever body 11 such that the front rod 14 faces the front surface of the pedal arm 3, and a rear rod 15 that is bent from a second side surface of the second end of the lever body 11 such that the rear rod 15 faces the rear surface of the pedal arm 3.

Further, a front stopper 16 and a rear stopper 17 are combined with the front rod 14 and the rear rod 15, respectively, so as to control the contact timing of the front and rear rods 14 and 15 with the pedal arm 3.

Here, the front stopper 16 and the rear stopper 17 are combined with the front rod 14 and the rear rod 15, respectively, by a threaded combination manner such that the protruding lengths of the stoppers 16 and 17 relative to the pedal arm 3 can be adjusted.

In other words, when the front stopper 16 is moved such that the front stopper 16 further protrudes toward the pedal arm 3, the contact timing of the pedal arm 3 with the front stopper 16 during a forward rotation of the pedal arm 3 becomes earlier. Accordingly, the switch lever 10 can start a forward rotation at an earlier time, and finally, the locking protrusions 13 of the switch lever 10 which are combined with the reaction providing unit 20 can pass the reference line C1 at an earlier time. Here, at the time the locking protrusions 13 of the switch lever 10 pass the reference line C1, the spring force of the reaction providing unit 20 becomes maximized.

On the contrary, when the front stopper 16 is moved such that the protruding length of the front stopper 16 relative to the pedal arm 3 becomes reduced, the contact timing of the pedal arm 3 with the front stopper 16 during a forward rotation of the pedal arm 3 becomes delayed. Accordingly, the time the locking protrusions 13 of the switch lever 10 which are combined with the reaction providing unit 20 pass the reference line C1 becomes delayed, and the time the spring force of the reaction providing unit 20 becomes maximized becomes delayed.

Further, when the rear stopper 17 is moved such that the rear stopper 17 further protrudes toward the pedal arm 3, the contact time of the pedal arm 3 with the rear stopper 17 during a rearward rotation of the pedal arm 3 (for returning to an original position) becomes earlier. Accordingly, the switch lever 10 can start a rearward rotation at an earlier time, so the time a reaction force is applied to a pedal that a driver senses becomes earlier.

On the contrary, when the rear stopper 17 is moved such that the protruding length of the rear stopper 17 relative to the pedal arm 3 becomes reduced, the contact timing of the pedal arm 3 with the rear stopper 17 during a rearward rotation of the pedal arm 3 (for returning to the original position) becomes delayed, and finally, the time a reaction force is applied to the pedal becomes delayed.

Further, the reaction providing unit 20 according to an exemplary embodiment of the present invention includes: a rotating shaft 21 that is rotatably installed by passing through opposite side surfaces of the pedal member 1, a shaft holder 22, with a surface contact groove 22a formed on a first end of the shaft holder 22 so as to be supported by coming into surface contact with the outer circumferential surface of the rotating shaft 21, and with a guide pin 22b axially extending from a second end of the shaft holder 22, a lever holder 23, with a fork part 23b formed in a first end of the lever holder 23 and having a locking groove 23a so as to be engaged with the locking protrusions 13 of the switching lever 10, and with a holder rod 23c axially extending from a second end of the lever holder 23 and having a pin insert hole 23d so as to receive the guide pin 22b of the shaft holder 22 therein, a nut 24 engaged with the holder rod 23c, and a compression spring 25 that is fitted over the holder rod 23c in a state in which opposite ends of the compression spring 25 are stopped by the shaft holder 22 and the nut 24, respectively.

Here, a C-shaped clip 21a is combined with the first end of the rotating shaft 21 so as to prevent the rotating shaft 21 from being undesirably removed from the pedal member 1.

Further, external threads 23e are formed around the outer circumferential surface of the holder rod 23c in an axial direction of the holder rod 23c, and the nut 24 is engaged with the external threads 23e of the holder rod 23c such that the nut 24 can adjust the elasticity of the compression spring 25 by moving along the axial direction of the holder rod 23c.

Further, the locking groove 23a of the lever holder 23 is configured such that the locking groove 23a is open forward based on a state in which the pedal arm 3 is not rotated. Here, the locking groove 23a of the lever holder 23 is characterized in that the opening angle of the locking groove 23a is designed such that, to prevent the locking protrusions 13 from being undesirably removed from the locking groove 23a during a rotation of the switching lever 10, the opening angle of the locking groove 23a is inclined downward at a predetermined angle θ1 of inclination relative to an axis L1 (see FIG. 6) along which the locking protrusions 13 are combined with the locking groove 23a.

Hereinbelow, the operation of the clutch pedal effort reducing apparatus according to the exemplary embodiment of the present invention will be described.

FIG. 3 illustrates a state of the apparatus in which the pedal arm 3 has been rotated to the maximum in a direction toward a driver. In other words, the state of the apparatus shown in FIG. 3 may be a state before the driver works the pedal arm 3 or an initial state of the operation before the driver applies a force to the pedal arm 3.

In this state, the elasticity of the compression spring 25 that constitutes the reaction providing unit 20 is applied to the pedal arm 3 via both the switching lever 10 and the front stopper 16, so the pedal arm 3 is normally biased by a restoring force that intends to rotate the pedal arm 3 rearward (counterclockwise direction), and this allows the pedal arm 3 to be efficiently maintained in the initial state without quaking due to the restriction performed by the switching lever 10, and further, induces complete returning of the pedal arm 3 to the original position. Accordingly, the apparatus of the present invention can realize reliable coupling of the clutch disc to the flywheel, so the apparatus of this invention is advantageous in that it can be efficiently used in a vehicle that is equipped with a high horsepower engine capable of generating high output power, without breaking parts of the vehicle.

Further, during an initial working stage in which the driver works the pedal arm 3 so as to gradually rotate the pedal arm 3 forward from the initial state shown in FIG. 3, the front surface of the pedal arm 3 comes into contact with the front stopper 16. When the pedal arm 3 in the above state is further rotated forward, the switching lever 10 is also rotated forward (clockwise direction) together with the pedal arm 3.

During the above-mentioned initial working stage in which the driver works the pedal arm 3, the elasticity of the compression spring 25 that constitutes the reaction providing unit 20 is applied to the pedal via both the switching lever 10 and the pedal arm 3, so the driver senses pedal effort that gradually raises the pedal arm 3, thereby sensing the operational state of the pedal arm 3.

Further, when the pedal arm 3 is further rotated forward and the switching lever 10 is rotated in the same direction together with the pedal arm 3, the pedal effort sensed by the driver becomes gradually increased. In this case, at the time the locking protrusions 13 of the switching lever 10 which are combined with the lower end of the reaction providing unit 20 pass the reference line C1 (line passing both the center of the pedal hinge and the joint at which the pedal member is combined with the upper end of the reaction providing unit), the pedal effort sensed by the driver becomes maximized.

Further, until the locking protrusions 13 of the switching lever 10 gradually approach the reference line C1 during a continuous rotation of both the pedal arm 3 and the switching lever 10 from the initial state shown in FIG. 3, the length of the compression spring 25 of the reaction providing unit 20 gradually becomes reduced and elasticity is accumulated in the compression spring 25 due to a movement of the switching lever 10 for raising the lever holder 23.

Figure 7:
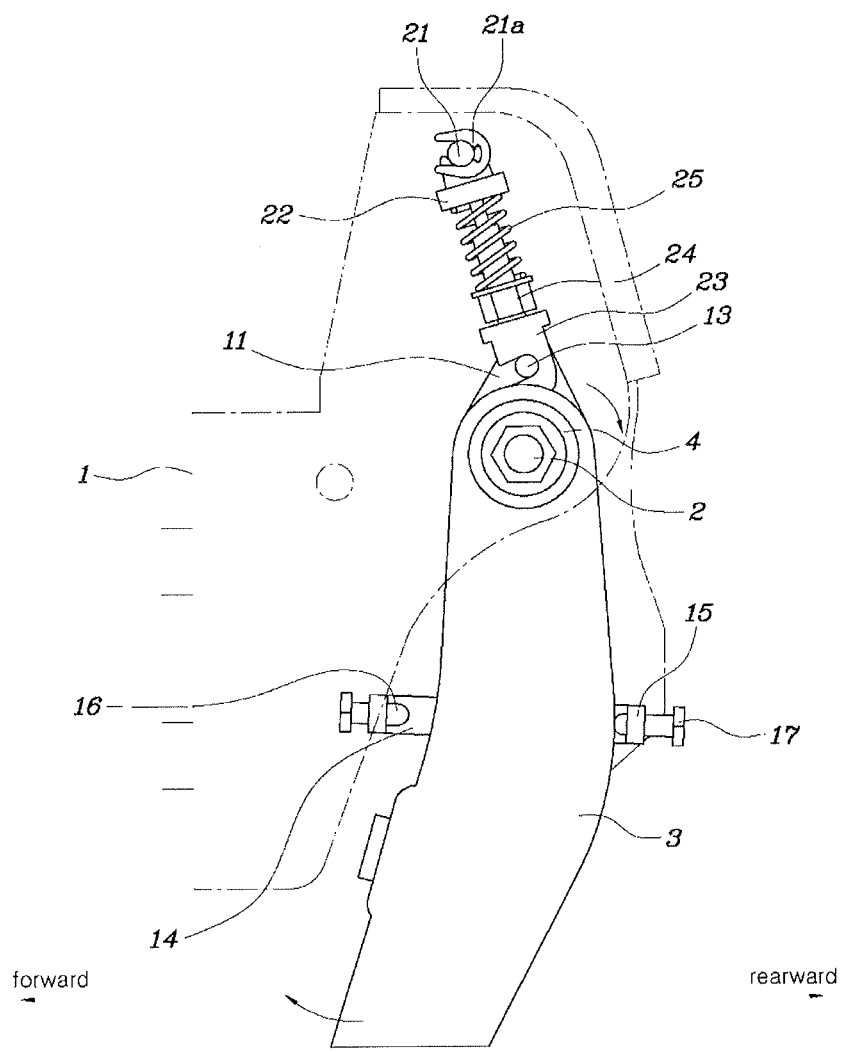
FIG. 7 is a view showing the operation of the clutch pedal effort reducing apparatus according to an exemplary embodiment of the present invention, when a driver works the pedal arm with a full stroke.

FIG. 7 illustrates a state in which the driver has fully worked the pedal arm 3 so as to rotate the pedal arm 3 forward with a full stroke. In the state shown in FIG. 7, the locking protrusions 13 of the switching lever 10 have passed the reference line C1 due to the continuous forward rotation of both the pedal arm 3 and the switching lever 10 from the initial working stage of the pedal arm 3.

When the procedure of the apparatus approaches the time the locking protrusions 13 of the switching lever 10 pass the reference line C1, the rising movement of the lever holder 23 is terminated and the deformation of the compression spring 25 of the reaction providing unit 20 which has resulted in a reduction of the compression spring 25 does not further occur, but the shortened compression spring 25 performs an action of restoring the original length thereof.

Accordingly, the compression spring 25 of the reaction providing unit 20 biases the switching lever 10 clockwise using accumulated elasticity thereof in the drawings, so the rear stopper 17 of the switching lever 10 comes into contact with the rear surface of the pedal arm 3, and pushes the pedal arm 3 forward.

Therefore, during a forward rotation of the pedal arm 3, elasticity of the compression spring 25 constituting the reaction providing unit 20 is applied to the pedal arm 3, so the forward rotating force of the pedal arm 3 is greatly increased, thereby generating a substantial force capable of reducing the pedal effort and efficiently reducing the pedal effort that may be sensed by the driver. Such a reduction in the pedal effort can efficiently attenuate the fatigue of the driver while working the pedal arm 3.

As described above, the clutch pedal effort reducing apparatus according to the exemplary embodiment of the present invention is advantageous in that, during an initial state in which the pedal arm 3 is not worked, elasticity of the compression spring 25 constituting the reaction providing unit 20 biases the pedal arm 3 so as to induce complete restoring of the pedal arm 3 to an original position thereof, thereby realizing reliable coupling of the clutch disc to the flywheel. Accordingly, the apparatus of this invention can be efficiently used in a vehicle that is equipped with a high horsepower engine capable of generating high output power, without breaking parts of the vehicle.

Further, after the time the locking protrusions 13 of the switching lever 10 combined with the reaction providing unit 20 pass the reference line C1 (line passing both the center of the pedal hinge and the joint at which the pedal member is combined with the upper end of the reaction providing unit) by driver's full stroke working on the pedal arm 3, the pedal arm 3 is rotated forward by the elasticity of the compression spring 25 which is applied to the pedal arm 3. Thus, the forward rotating force of the pedal arm 3 is greatly increased during a forward rotation of the pedal arm 3, thereby generating a substantial force capable of reducing the pedal effort and efficiently reducing the pedal effort that may be sensed by the driver. Such a reduction in the pedal effort can efficiently attenuate the fatigue of the driver while working the pedal arm 3.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for reducing a clutch pedal effort, comprising:
   a switching lever rotatably assembled to a pedal member and selectively engaged with a pedal arm; and
   a reaction providing unit, a first end of which is engaged with the pedal member and a second end of which is engaged with the switching lever,
   wherein the switching lever comprises:
      a lever body that is a straight flat plate;
      a cylindrical flange formed on a first end of the lever body to be coupled to a hinge pipe;
      locking protrusions formed on opposite surfaces of the first end of the lever body by protruding such that a lower end of the reaction providing unit is combined with the locking protrusions;
      a front rod bent from a first side surface of a second end of the lever body such that the front rod faces a front surface of the pedal arm; and
      a rear rod bent from a second side surface of the second end of the lever body such that the rear rod faces a rear surface of the pedal arm.

2. The apparatus for reducing the clutch pedal effort as set forth in claim 1, comprising:
   the switching lever rotatably assembled to the pedal member with the hinge pipe, through which a pedal hinge passes, such that, when the pedal arm is rotated, the switching lever is rotated along with the pedal arm in a state in which the switching lever comes into contact with the pedal arm; and
   the reaction providing unit placed at a location above the pedal hinge, with the first end thereof combined with the pedal member and the second end thereof combined with the switching lever,
   wherein when the switching lever is not rotated, the reaction providing unit sets an initial position of the switching lever by restricting a movement of the switching lever using accumulated elasticity thereof,
   wherein when the switching lever is rotated forward together with the pedal arm, the reaction providing unit intensifies a forward rotation of the pedal arm, and wherein when the switching lever is rotated rearward together with the pedal arm, the reaction providing unit provides a reaction force to the pedal arm via the switching lever.

3. The apparatus for reducing the clutch pedal effort as set forth in claim 2, wherein, to allow the reaction providing unit to set the initial position of the switching lever in a state in which the pedal arm is not worked, a joint at which the switching lever is combined with the reaction providing unit is placed ahead of a reference line that passes both a center of the pedal hinge and a joint at which the pedal member is combined with the reaction providing unit.

4. The apparatus for reducing the clutch pedal effort as set forth in claim 1, wherein the front rod and the rear rod are combined with a front stopper and a rear stopper, respectively, so as to control contact timing of the front and rear rods with the pedal arm.

5. The apparatus for reducing the clutch pedal effort as set forth in claim 4, wherein the front stopper and the rear stopper are coupled with the front rod and the rear rod, respectively, by a thread so as to adjust protruding lengths of the front and rear stoppers relative to the pedal arm.

6. The apparatus for reducing the clutch pedal effort as set forth in claim 1, wherein the reaction providing unit comprises:
a rotating shaft rotatably installed by passing through opposite side surfaces of the pedal member;
a shaft holder having:
a surface contact groove formed on a first end of the shaft holder so as to be supported by coming into surface contact with an outer circumferential surface of the rotating shaft; and
a guide pin axially extending from a second end of the shaft holder;
a lever holder having:
a fork part formed in a first end of the lever holder and having a locking groove so as to be engaged with the locking protrusions of the switching lever; and
a holder rod axially extending from a second end of the lever holder and having a pin insert hole so as to receive the guide pin of the shaft holder therein;
a nut engaged with the holder rod; and
a compression spring fitted over the holder rod in a state in which opposite ends of the compression spring are stopped by the shaft holder and the nut, respectively.

7. The apparatus for reducing the clutch pedal effort as set forth in claim 6,
wherein the holder rod is provided with external threads around an outer circumferential surface thereof in an axial direction of the holder rod; and
wherein the nut is engaged with the external threads of the holder rod such that the nut adjusts elasticity of the compression spring by moving along the axial direction of the holder rod.

8. The apparatus for reducing the clutch pedal effort as set forth in claim 6,
wherein the locking groove is open forward based on a state in which the pedal arm is not rotated, and
wherein an opening angle of the locking groove is designed such that, to prevent the locking protrusions from being removed from the locking groove during a rotation of the switching lever, the opening angle of the locking groove is inclined downward at a predetermined angle of inclination relative to an axis along which the locking protrusions are combined with the locking groove.

* * * * *